(12) United States Patent
Ko et al.

(10) Patent No.: US 9,025,473 B2
(45) Date of Patent: May 5, 2015

(54) METHOD AND APPARATUS FOR TRANSMITTING CQI IN WIRELESS COMMUNICATION SYSTEM

(75) Inventors: Hyun Soo Ko, Anyang-si (KR); Moon Il Lee, Anyang-si (KR); Jae Hoon Chung, Anyang-si (KR); So Yeon Kim, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 13/265,814

(22) PCT Filed: May 14, 2010

(86) PCT No.: PCT/KR2010/003049
§ 371 (c)(1),
(2), (4) Date: Oct. 21, 2011

(87) PCT Pub. No.: WO2010/131919
PCT Pub. Date: Nov. 18, 2010

(65) Prior Publication Data
US 2012/0044894 A1      Feb. 23, 2012

Related U.S. Application Data

(60) Provisional application No. 61/178,375, filed on May 14, 2009, provisional application No. 61/178,504, filed on May 15, 2009.

(30) Foreign Application Priority Data

Sep. 4, 2009 (KR) .................. 10-2009-0083683

(51) Int. Cl.
| | | |
|---|---|---|
| H04L 12/26 | (2006.01) |
| H04L 1/00 | (2006.01) |
| H04L 5/00 | (2006.01) |
| H04W 72/04 | (2009.01) |

(52) U.S. Cl.
CPC ............... *H04L 1/0026* (2013.01); *H04L 43/08* (2013.01); *H04L 5/0046* (2013.01); *H04W 72/04* (2013.01); *H04L 1/0027* (2013.01)

(58) Field of Classification Search
None
See application file for complete search history.

(56) References Cited

U.S. PATENT DOCUMENTS

2010/0227569 A1* 9/2010 Bala et al. ................. 455/73
2010/0254329 A1* 10/2010 Pan et al. ................. 370/329
2010/0271970 A1* 10/2010 Pan et al. ................. 370/252

FOREIGN PATENT DOCUMENTS

| EP | 1309121 | 5/2003 |
| KR | 10-2005-0078636 | 8/2005 |
| KR | 10-2007-0107449 | 11/2007 |

* cited by examiner

*Primary Examiner* — Khoa Huynh
(74) *Attorney, Agent, or Firm* — Lee, Hong, Degerman, Kang & Waimey

(57) ABSTRACT

A method and apparatus for transmitting a channel quality indicator (CQI) in a wireless communication system are provided. The method includes: receiving a CQI request message requesting a CQI report over a first downlink component carrier; and transmitting a CQI for at least one second downlink component carrier over an uplink component carrier.

13 Claims, 9 Drawing Sheets

METHOD AND APPARATUS FOR TRANSMITTING CQI IN WIRELESS COMMUNICATION SYSTEM

This application is the National Stage filing under 35 U.S.C. 371 of International Application No. PCT/KR2010/003049, filed on May 14, 2010, which claims the benefit of earlier filing date and right of priority to Korean Application No. 10-2009-0083683, filed on Sep. 4, 2009, and also claims the benefit of U.S. Provisional Application Serial Nos. 61/178,375, filed on May 14, 2009, and 61/178,504, filed on May 15, 2009, the contents of which are all hereby incorporated by reference herein in their entirety.

TECHNICAL FIELD

The present invention relates to wireless communications, and more particularly, to a method and apparatus for transmitting a channel quality indicator (CQI) in a wireless communication system.

BACKGROUND ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

A multiple input multiple output (MIMO) scheme is used as a technique for supporting a reliable high-speed data service. The MIMO scheme uses multiple transmit antennas and multiple receive antennas to improve data transmission/reception efficiency. Examples of the MIMO scheme include spatial multiplexing, transmit diversity, beamforming, etc. A MIMO channel matrix depending on the number of receive antennas and the number of transmit antennas can be decomposed into a plurality of independent channels. Each independent channel is referred to as a transmission layer or a stream. The number of transmission layer is referred to as a rank.

Adaptive modulation and coding (AMC) is a technique for increasing reliability of wireless communication. In the AMC, a modulation and coding scheme (MCS) is determined according to a channel state. A wireless communication system may use a channel quality indicator (CQI) for the support of the AMC. The CQI is information on a channel state between a base station (BS) and a user equipment (UE). The BS can determine the MCS used for transmission by using the CQI fed back from the UE. If it is determined that the channel state is good by using the CQI, the BS may increase a data transfer rate by increasing a modulation order or an encoding rate. Otherwise, if it is determined that the channel state is not good by using the CQI, the BS may decrease the data transfer rate by decreasing the modulation order or the encoding rate. The decrease in the data transfer rate may result in the decrease in a reception error rate.

Meanwhile, there is an ongoing standardization effort for an international mobile telecommunication-advanced (IMT-A) system aiming at the support of an Internet protocol (IP)-based multimedia seamless service by using a high-speed data transfer rate of 1 gigabits per second (Gbps) in a downlink and 500 megabits per second (Mbps) in an uplink in the international telecommunication union (ITU) as a next generation (i.e., post $3^{rd}$ generation) mobile communication system. A $3^{rd}$ generation partnership project (3GPP) is considering a 3GPP long term evolution-advanced (LTE-A) system as a candidate technique for the IMT-A system. It is expected that the LTE-A system is developed to further complete an LTE system while maintaining backward compatibility with the LTE system. This is because the support of compatibility between the LTE-A system and the LTE system facilitates user convenience. In addition, the compatibility between the two systems is also advantageous from the perspective of service providers since the existing equipment can be reused.

A typical wireless communication system is a single carrier system supporting one carrier. Since a data transfer rate is in proportion to a transmission bandwidth, the transmission bandwidth needs to increase to support a high-speed data transfer rate. However, except for some areas of the world, it is difficult to allocate frequencies of wide bandwidths. For the effective use of fragmented small bands, a spectrum aggregation (or bandwidth aggregation or a carrier aggregation) technique is being developed. The spectrum aggregation technique is a technique for obtaining the same effect as when a band of a logically wide bandwidth is used by aggregating a plurality of physically non-contiguous bands in a frequency domain. By using the spectrum aggregation technique, multiple carriers can be supported in the wireless communication system. The wireless communication system supporting the multiple carriers is referred to as a multiple carrier system. The carrier may also be referred to as other terms, such as, a radio frequency (RF), a component carrier (CC), etc. The carrier will be hereinafter referred to as the CC.

Accordingly, there is a need to provide a method and apparatus for effectively transmitting a CQI in a multiple carrier system.

SUMMARY OF INVENTION

Technical Problem

The present invention provides a method and apparatus for transmitting a channel quality indicator (CQI) in a wireless communication system.

Solution to Problem

According to an aspect of the present invention, there is provided a method of transmitting a channel quality indicator (CQI), performed by a user equipment, in a wireless communication system. The method includes: receiving a CQI request message requesting a CQI report over a first downlink component carrier from a base station; and transmitting a CQI for at least one second downlink component carrier over an uplink component carrier to the base station.

According to another aspect of the present invention, there is provided a wireless communication apparatus including: a radio frequency (RF) unit for transmitting and/or receiving a radio signal; and a processor coupled to the RF unit and configured for receiving a CQI request message requesting a CQI report over a first downlink component carrier, and for transmitting a CQI for at least one second downlink component carrier over an uplink component carrier.

Advantageous Effects of Invention

According to the present invention, a method and apparatus for transmitting a channel quality indicator (CQI) can be provided. Therefore, overall system performance can be improved.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity, the following description will focus on the 3GPP LTE/LTE-A. However, technical features of the present invention are not limited thereto.

Figure 1:
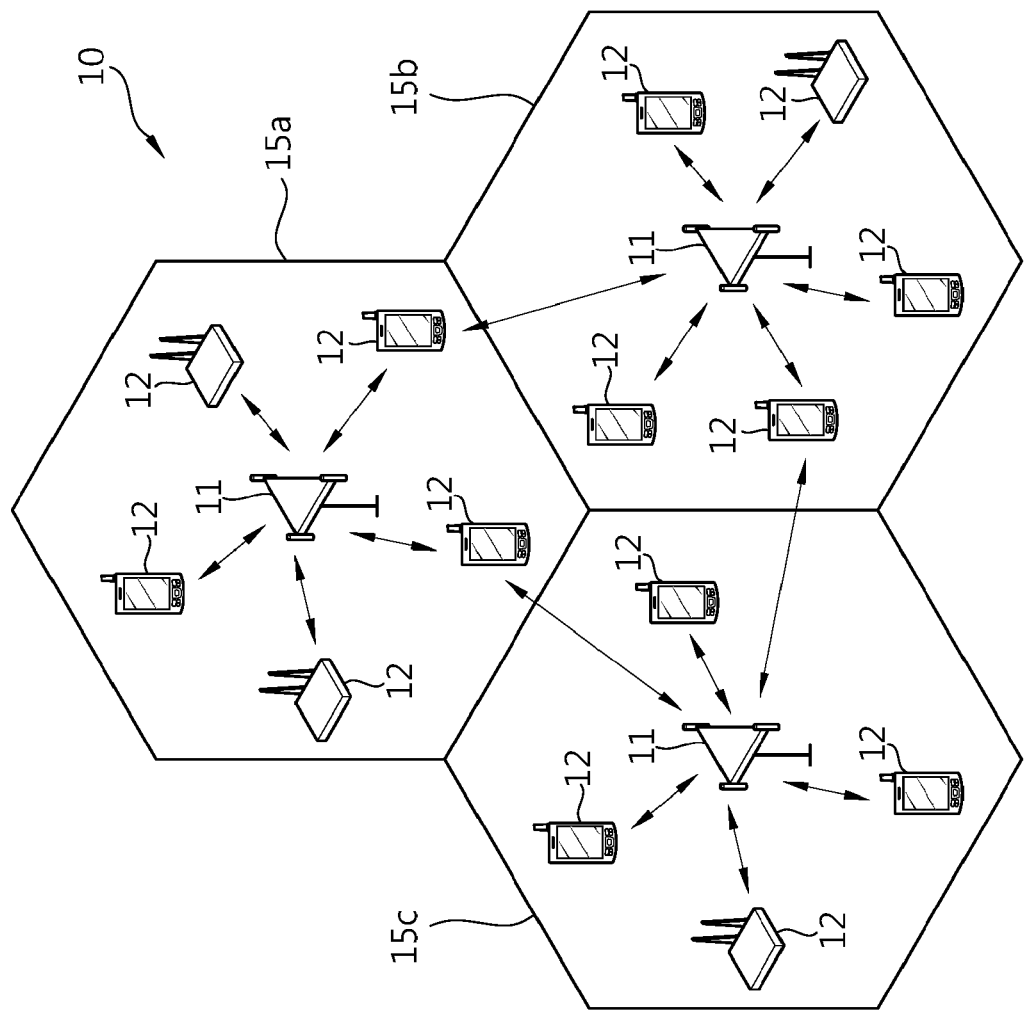
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. The BS 11 is generally a fixed station that communicates with the UE 12 and may be referred to as another terminology, such as an evolved node-B (eNB), a base transceiver system (BTS), an access point, an access network (AN), etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

The wireless communication system can support multiple antennas. The transmitter may use a plurality of transmit antennas, and the receiver may use a plurality of receive antennas. The transmit antenna denotes a physical or logical antenna used for transmission of one signal or stream. The receive antenna denotes a physical or logical antenna used for reception of one signal or stream. When the transmitter and the receiver use a plurality of antennas, the wireless communication system may be referred to as a multiple input multiple output (MIMO) system.

A wireless communication process is preferably implemented with a plurality of independent hierarchical layers rather than one single layer. A structure of a plurality of hierarchical layers is referred to as a protocol stack. The protocol stack may refer to an open system interconnection (OSI) model which is a widely known protocol for communication systems.

Figure 2:
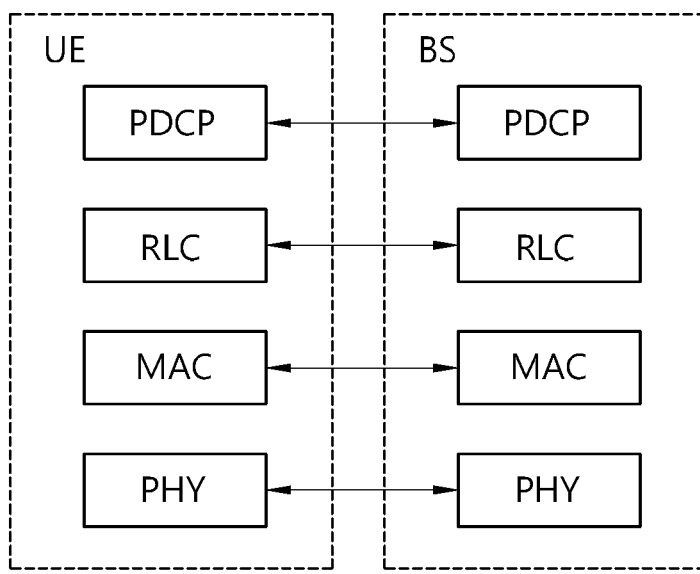
FIG. 2 is a diagram showing a radio protocol architecture for a user plane.
Figure 3:
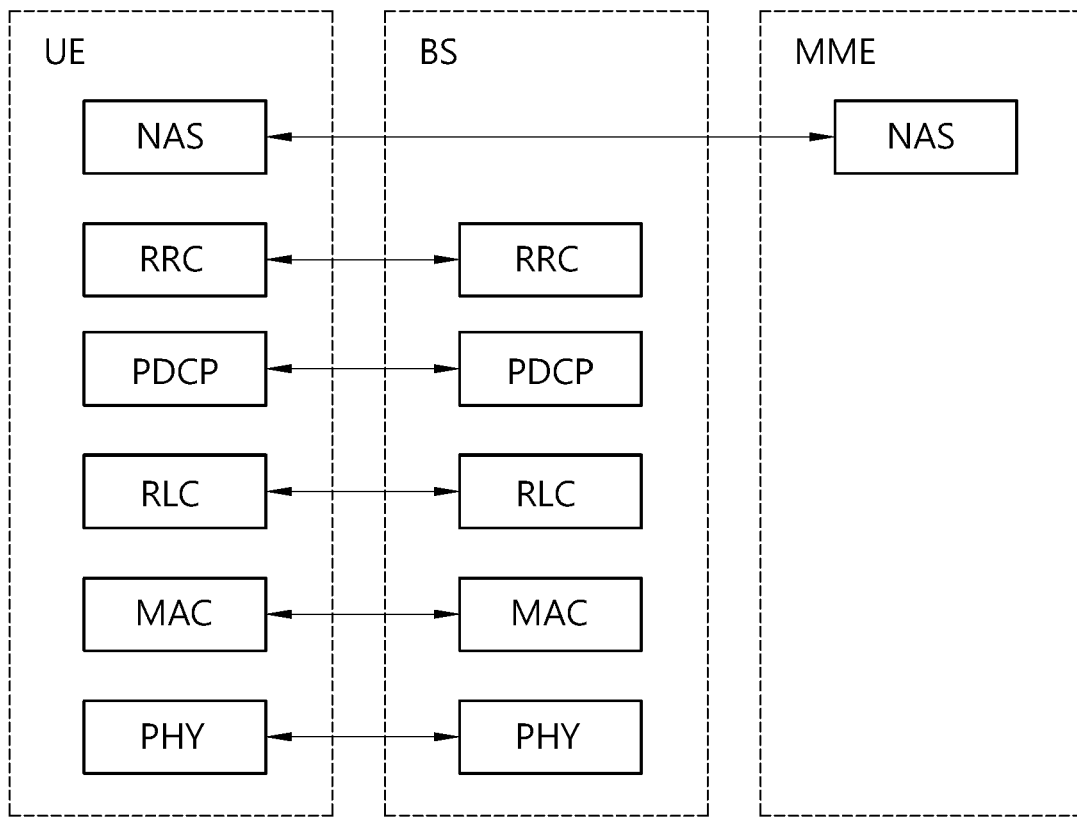
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, between different physical (PHY) layers (i.e., a PHY layer of a transmitter and a PHY layer of a receiver), data is transferred through a physical channel. The PHY layer is also referred to as a layer 1 (L1). The PHY layer is coupled with a medium access control (MAC) layer, i.e., an upper layer of the PHY layer, through a transport channel. Between the MAC layer and the PHY layer, data is transferred through the transport channel. The PHY layer provides the MAC layer and an upper layer with an information transfer service through the transport channel.

The MAC layer provides services to a radio link control (RLC) layer, i.e., an upper layer of the MAC layer, through a logical channel. The RLC layer supports reliable data transmission. A packet data convergence protocol (PDCP) layer performs a header compression function to reduce a header size of an Internet protocol (IP) packet. The MAC layer, the RLC layer, and the PDCP layer are also referred to as a layer 2 (L2).

A radio resource control (RRC) layer is defined only in the control plane. The RRC layer is also referred to as a layer 3

(L3). The RRC layer controls radio resources between a UE and a network. For this, in the RRC layer, RRC messages are exchanged between the UE and the network. The RRC layer serves to control the logical channel, the transport channel, and the physical channel in association with configuration, re-configuration and release of radio bearers (RBs). An RB represents a logical path provided by the L1 and the L2 for data transmission between the UE and the network. Configuration of the RB implies a process for defining characteristics of a radio protocol layer and channel to provide a specific service, and for configuring respective specific parameters and operation mechanisms. The RB can be classified into a signaling RB (SRB) and a data RB (DRB). The SRB is used as a path for transmitting an RRC message in the control plane, and the DRB is used as a path for transmitting user data in the user plane. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 4:
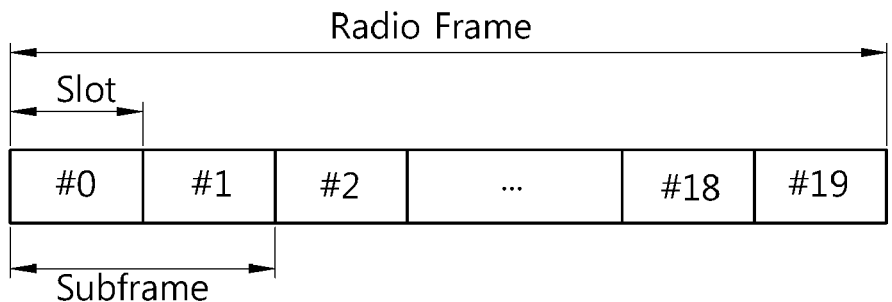
FIG. 4 shows a structure of a radio frame.

FIG. 4 shows a structure of a radio frame.

Referring to FIG. 4, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 4 is shown for exemplary purposes only. Thus, the number of subframes included in the radio frame or the number of slots included in the subframe may change variously.

Figure 5:
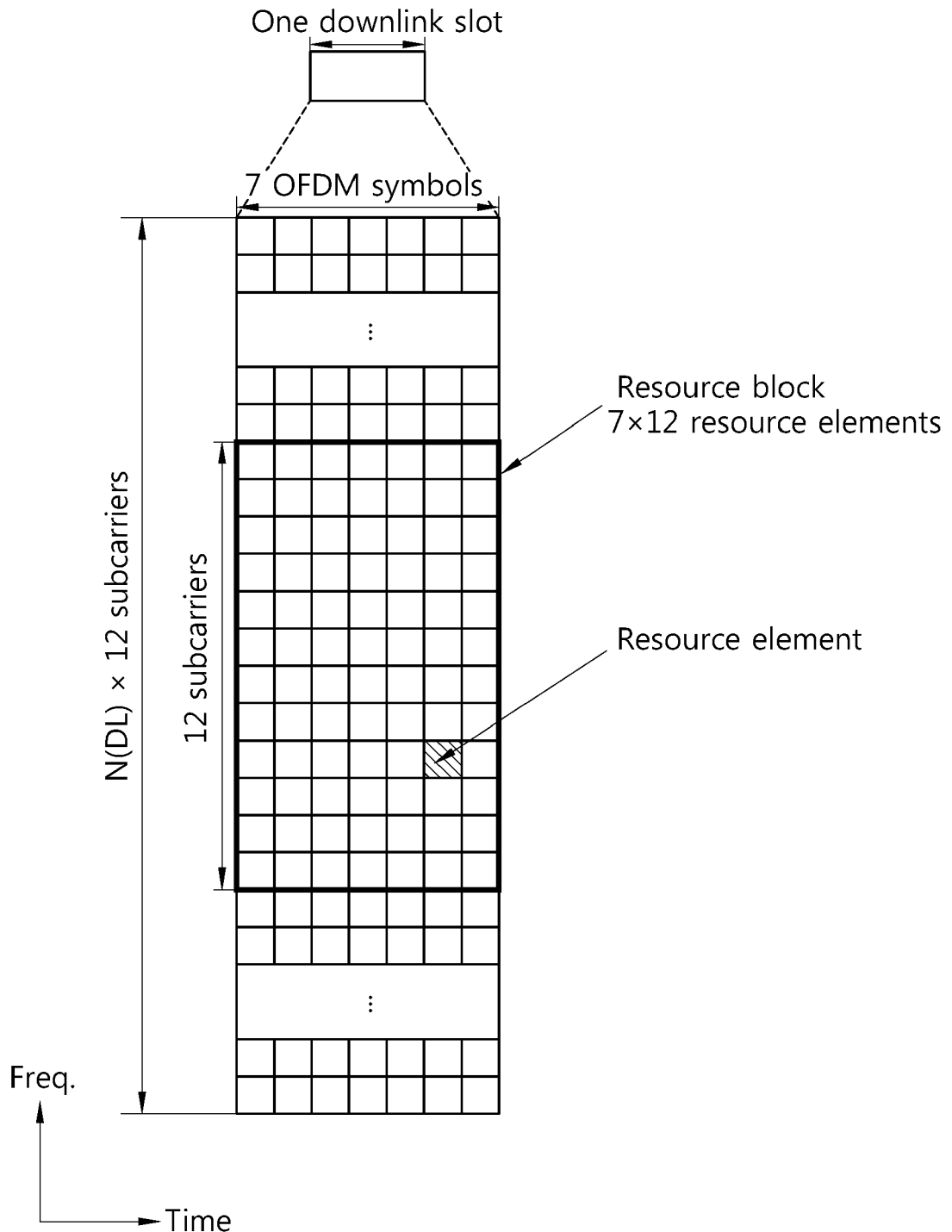
FIG. 5 shows an example of a resource grid for one downlink (DL) slot.

FIG. 5 shows an example of a resource grid for one DL slot.

Referring to FIG. 5, the DL slot includes a plurality of orthogonal frequency division multiplexing (OFDM) symbols in a time domain and N(DL) resource blocks (RBs) in a frequency domain. The OFDM symbol represents one symbol period, and may also be referred to as other terms such as an OFDMA symbol, an SC-FDMA symbol, or the like according to a multiple access scheme. The number N(DL) of RBs included in the DL slot depends on a DL transmission bandwidth determined in a cell. One RB includes a plurality of subcarriers in the frequency domain.

Each element on the resource grid is referred to as a resource element (RE). Although it is described herein that one RB includes 7 (12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a subcarrier spacing, etc. For example, when using a normal CP, the number of OFDM symbols is 7, and when using an extended CP, the number of OFDM symbols is 6.

The resource grid for one DL slot of FIG. 5 can also apply to a resource grid for a UL slot.

Figure 6:
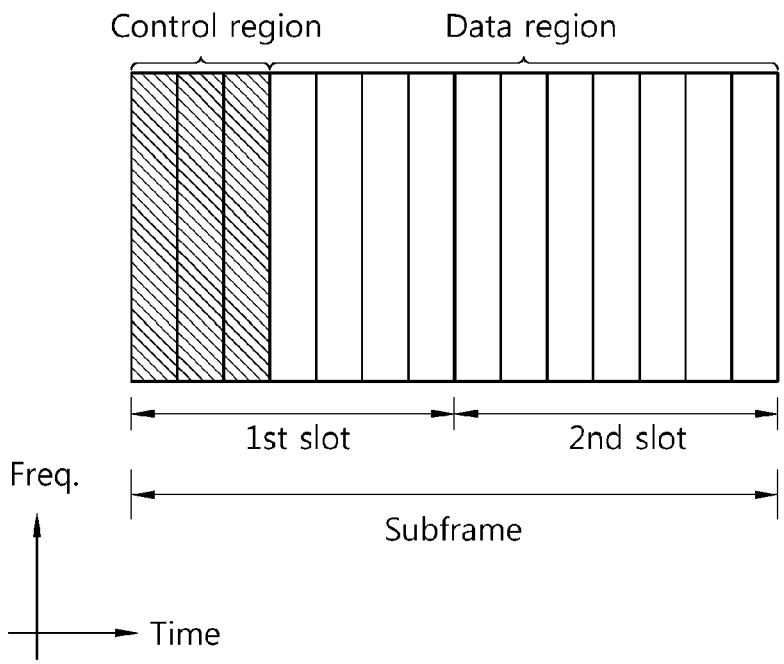
FIG. 6 shows a structure of a DL subframe.

FIG. 6 shows a structure of a DL subframe.

Referring to FIG. 6, the DL subframe includes two consecutive slots. First 3 OFDM symbols of a $1^{st}$ slot included in the DL subframe correspond to a control region, and the remaining OFDM symbols correspond to a data region. Herein, the control region includes 3 OFDM symbols for exemplary purposes only.

A physical downlink shared channel (PDSCH) may be allocated to the data region. DL data is transmitted over the PDSCH.

A control channel may be allocated to the control region. Examples of the control channel include a physical control format indicator channel (PCFICH), a physical hybrid automatic repeat request (HARQ) indicator channel (PHICH), a physical downlink control channel (PDCCH), etc.

The PCFICH carries information indicating the number of OFDM symbols used for transmission of PDCCHs in a subframe to a UE. The number of OFDM symbols used for PDCCH transmission may change in every subframe. In the subframe, the number of OFDM symbols used for PDCCH transmission may be any one value among 1, 2, and 3. If a DL transmission bandwidth is less than a specific threshold, the number of OFDM symbols used for PDCCH transmission in the subframe may be any one value among 2, 3, and 4.

The PHICH carries HARQ acknowledgement (ACK)/negative acknowledgement (NACK) for UL data.

The control region consists of a set of a plurality of control channel elements (CCEs). If a total number of CCEs constituting a CCE set is N(CCE) in the DL subframe, the CCEs are indexed from 0 to N(CCE)−1. The CCEs correspond to a plurality of resource elements groups. The resource element group is used to define mapping of the control channel to a resource element. One resource element group consists of a plurality of resource elements. A PDCCH is transmitted over an aggregation of one or several contiguous CCEs. A plurality of PDCCHs may be transmitted in the control region. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of $\{1, 2, 4, 8\}$.

The PDCCH carries DL control information. Examples of the DL control information include DL scheduling information, UL scheduling information, a UL power control command, etc. The DL scheduling information is also referred to as a DL grant. The UL scheduling information is also referred to as a UL grant.

The DL control information may use different control information formats according to a usage. For example, a control information format used for the UL grant is different from a control information format used for the DL grant. The control information format consists of a plurality of information fields. A type of information fields constituting the control information format, a size of each information field, or the like may differ from one control information format to another.

A BS does not provide the UE with information indicating where a PDCCH of the UE is located in the subframe. In general, in a state where the UE does not know a location of the PDCCH of the UE in the subframe, the UE finds the PDCCH of the UE by monitoring a set of PDCCH candidates in every subframe. Monitoring implies that the UE attempts to perform decoding for each of the PDCCH candidates according to all possible DCI formats. This is referred to as blind decoding or blind detection.

For example, for UL data transmission, the UE may first detect a PDCCH for transmitting a UL grant by using blind decoding. The UE may transmit UL data on the basis of the UL grant.

Figure 7:
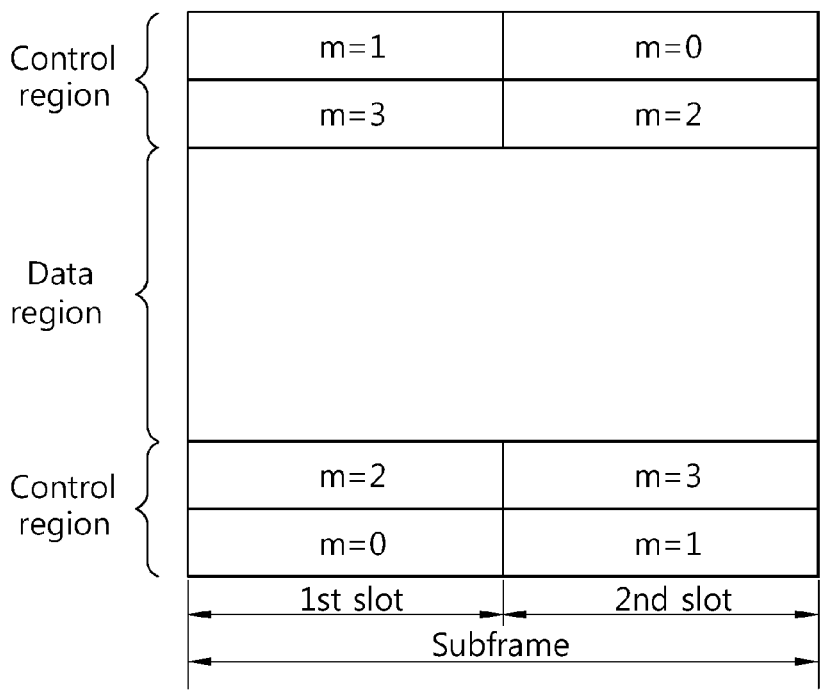
FIG. 7 shows an exemplary structure of an uplink (UL) subframe.

FIG. 7 shows an exemplary structure of a UL subframe.

Referring to FIG. 7, the UL subframe can be divided into a control region and a data region. The control region is allocated with a physical uplink control channel (PUCCH) for carrying UL control information. The data region is allocated with a physical uplink shared channel (PUSCH) for carrying user data. In 3GPP LTE, to maintain a single carrier property in UL transmission, resource blocks contiguous in a frequency domain are allocated to one UE. Further, in the 3GPP LTE, one UE cannot simultaneously transmit a PUCCH and a PUSCH.

In the subframe, the PUCCH for one UE is allocated in an RB pair. RBs belonging to the RB pair occupy different subcarriers in each of $1^{st}$ and $2^{nd}$ slots. This is called that the RB pair allocated to the PUCCH is frequency-hopped in a slot boundary. In FIG. 7, m is a location index indicating a frequency-domain location of an RB allocated to the PUCCH in the subframe.

The PUSCH is mapped to an uplink shared channel (UL-SCH) which is a transport channel. Examples of UL control information transmitted on the PUCCH include HARQ ACK/NACK, a channel quality indicator (CQI) indicating a DL channel state, a scheduling request (SR) as a request for UL radio resource allocation, etc.

The CQI may be used for link adaptation. A UE may measure the DL channel state and then feed back the CQI to a BS. The CQI collectively refers to spatial channel information for data transmission, channel state information, channel quality information, noise variance, etc. The channel state information is information on an estimated channel state without processing the channel state. The channel quality information is information indicating a signal to noise ratio of a channel. For example, the CQI may indicate an MCS level. The BS may use the CQI in a DL scheduling process.

In addition to the CQI, a MIMO system may further require another piece of feedback information for data transmission. The UE may report feedback information (e.g., a matrix indicating a spatial channel, a matrix indicating a statistical feature of the spatial channel, etc.) to the BS. A MIMO scheme capable of maximizing channel capacity by using precoding in a transmitter according to the feature of the spatial channel may be taken into account. Information for determining a weight value used for precoding by the BS may be reported from the UE to the BS. Examples of the feedback information include a precoding matrix indicator (PMI) capable of representing a state of the spatial channel, a channel state information matrix representing a spatial channel matrix, a covariance matrix indicating the statistical feature of the spatial channel, etc. The PMI indicates an index of a precoding matrix selected from a codebook which is a predefined weight set. In multiple antenna transmission, independent data can be transmitted through the spatial channel. A maximum number for identifying independent information is determined according to the feature of the spatial channel, and is referred to as a maximum rank of the spatial channel. According to a channel fading and geography, channel capacity depending on a transmission rank can be determined. The rank is determined such that the greatest channel capacity can be ensured in a current channel situation.

As such, in the MIMO system, the UE may feed back a PMI, a rank indicator (RI), or the like to the BS, in addition to the CQI, for data transmission. The RI indicates the number of useful transmission layers. Hereinafter, the CQI is the concept of including not only the CQI but also the PMI and the RI.

The CQI may be transmitted through either a control channel allocated for reporting the CQI or a data channel allocated for data transmission.

In the 3GPP LTE, a PUCCH which is a control channel for transmitting the CQI may be configured by higher layer signaling such as RRC layer signaling. The CQI may be reported periodically over the PUCCH. The UE may transmit the CQI periodically over the PUCCH in a subframe in which no PUSCH is allocated.

The BS may request the UE to feed back the CQI over the PUSCH which is a data channel by using layer 1 (L1)/layer 2 (L2) control signals. For example, the L1/L2 control signals may be a UL grant transmitted over the PDCCH. The UL grant may include a CQI request message indicating whether the CQI is reported. The UE determines whether the CQI request message included in the UL grant is activated. For example, according to whether the CQI request message has a specific value, the UE may determine whether the CQI request message is activated. If the CQI request message is activated, the UE may transmit the CQI over the PUSCH on the basis of the UL grant. The UE may perform periodic CQI transmission over the PUSCH in a subframe in which the PUSCH is allocated. In this case, the UE may use a periodic CQI format based on the same PUCCH over the PUSCH. The UE may perform non-periodic CQI transmission over the PUSCH. As such, the CQI transmission may be performed periodically or non-periodically.

A frame structure, a CQI transmission method, or the like have been described above for a single carrier system. Hereinafter, a multiple carrier system will be described.

Figure 8:
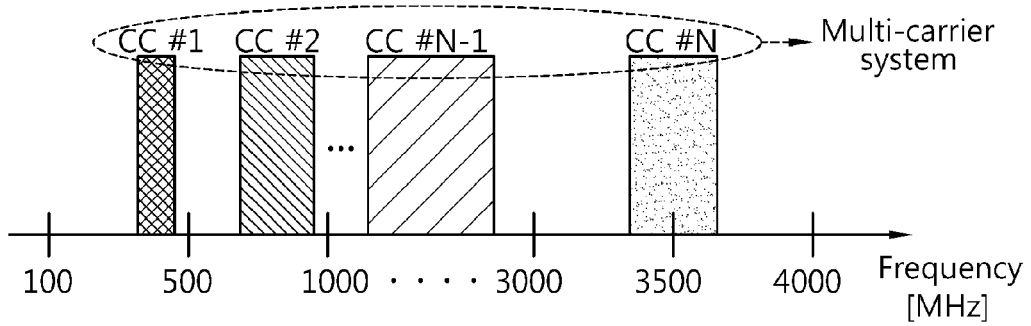
FIG. 8 shows an example of a plurality of component carriers (CCs) used in a multiple carrier system.

FIG. 8 shows an example of a plurality of component carriers (CCs) used in a multiple carrier system.

Referring to FIG. 8, the multiple carrier system may use N CCs, i.e., CC #1, CC #2, . . . , CC #N. It is shown herein that adjacent CCs are physically discontiguous in a frequency domain. However, this is for exemplary purposes only, and thus the adjacent CCs may be physically contiguous in the frequency domain. Therefore, the multiple carrier system may use a frequency having a logically wider bandwidth (BW) by aggregating a plurality of CCs physically discontiguous and/or contiguous in the frequency domain.

The multiple carrier system can support a plurality of DL CCs and a plurality of UL CCs. In the multiple carrier system, a BS can allocate one or more DL CCs and one or more UL CCs to a UE. In the multiple carrier system, the BS can simultaneously transmit information to one UE by using one or more CCs. The UE can also simultaneously transmit information to the BS by using one or more CCs.

The same DL CC and UL CCs may be allocated to all UEs in a cell. That is, the DL CC and the UL CC may be allocated to the UEs in the cell in a cell-specific manner. Alternatively, different DL (or UL) CCs may be allocated to different UEs in the cell. That is, the DL CCs and the UL CCs may be allocated in a UE-specific manner.

The multiple carrier system may have either a symmetric structure or an asymmetric structure. The symmetric structure is when the number of DL CCs is the same as the number of UL CCs. The asymmetric structure is when the number of DL CCs is different from the number of UL CCs.

Figure 9:
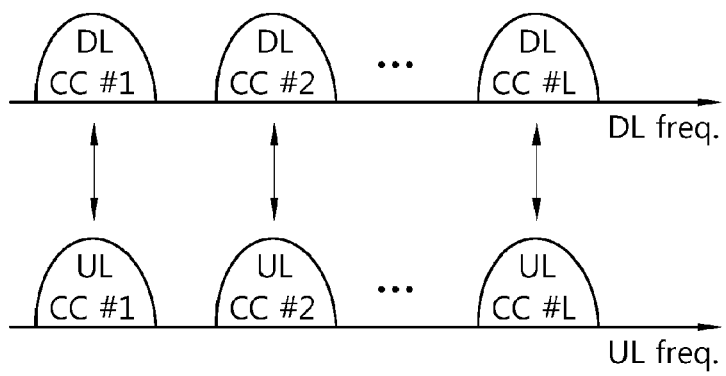
FIG. 9 shows an exemplary linkage between a DL CC and a UL CC in a multiple carrier system having a symmetric structure.

FIG. 9 shows an exemplary linkage between a DL CC and a UL CC in a multiple carrier system having a symmetric structure.

Referring to FIG. 9, the number of DL CCs is L and the number of UL CCs is also L. A DL CC #n is linked to a UL CC n (where n=1, 2, ..., L). That is, a plurality of DL CCs are one-to-one mapped to a plurality of UL CCs.

The linkage between the DL CC and the UL CC may have meaning as follows. First, DL control information for a UL CC may be transmitted using a DL CC linked to the UL CC. For example, if a UL grant is transmitted using a DL CC #n, the UL data may be transmitted using a UL CC #n linked to the DL CC #n on the basis of the UL grant. Further, HARQ ACK/NACK for UL data transmitted using the UL CC #n may be transmitted using the DL CC #n. Second, UL control information for a DL CC may be transmitted using a UL CC linked to the DL CC. For example, a CQI for a DL CC #n may be transmitted using a UL CC #n linked to the DL CC #n. HARQ ACK/NACK for DL data transmitted using the DL CC #n may be transmitted using the UL CC #n.

However, this is only for an exemplary linkage between the DL CC and the UL CC, and thus meaning of linkage is not limited thereto.

Figure 10:
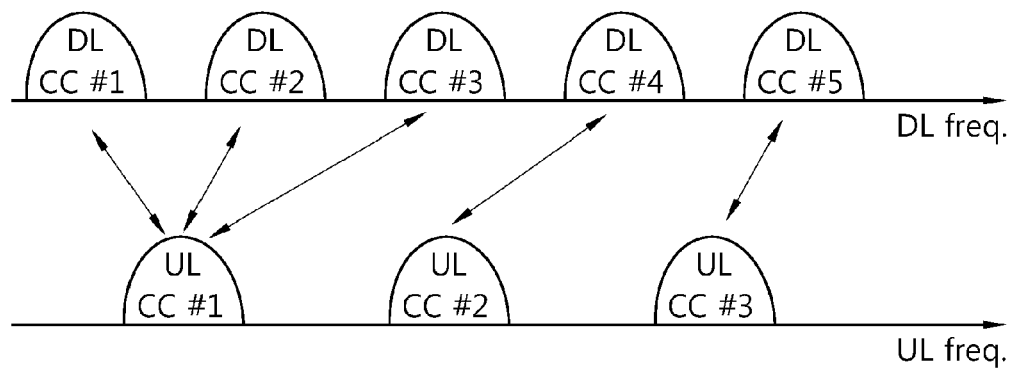
FIG. 10 shows an exemplary linkage between a DL CC and a UL CC in a multiple carrier system having an asymmetric structure.

FIG. 10 shows an exemplary linkage between a DL CC and a UL CC in a multiple carrier system having an asymmetric structure.

Referring to FIG. 10, 5 DL CCs (i.e., DL CC #1, DL CC #2, ..., DL CC #5) and 3 UL CCs (i.e., UL CC #1, UL CC #2, and UL CC #3) are allocated to one UE. The DL CCs #1, #2, and #3 are linked to the UL CC #1. The DL CC #4 is linked to the UL CC #2. The DL CC #5 is linked to the UL CC #3. As such, if the number of DL CCs is greater than the number of UL CCs, a plurality of DL CCs can be linked to one UL CC.

Figure 11:
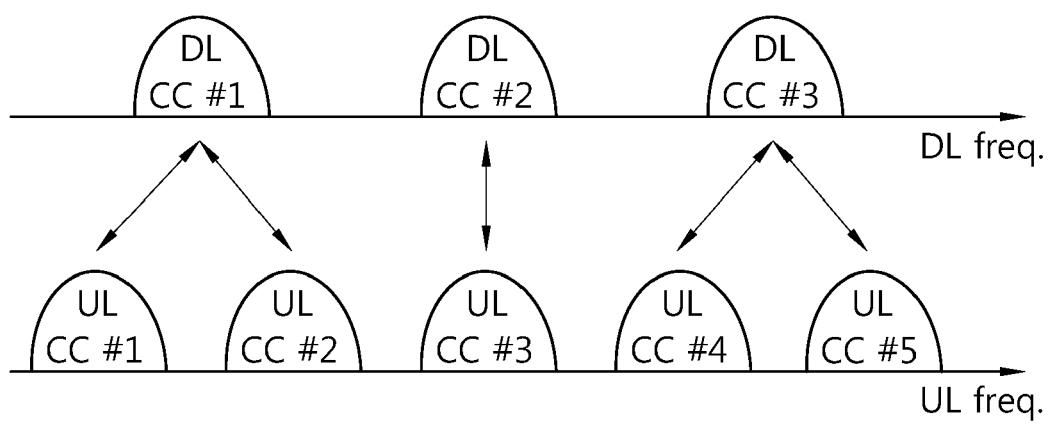
FIG. 11 shows another exemplary linkage between a DL CC and a UL CC in a multiple carrier system having an asymmetric structure.

FIG. 11 shows another exemplary linkage between a DL CC and a UL CC in a multiple carrier system having an asymmetric structure.

Referring to FIG. 11, 3 DL CCs (i.e., DL CC #1, DL CC #2, and DL CC #3) and 5 UL CCs (i.e., UL CC #1, UL CC #2, ..., UL CC #5) are allocated to one UE. The DL CC #1 is linked to the UL CC #1 and the UL CC #2. The DL CC #2 is linked to the UL CC #3. The DL CC #3 is linked to the UL CC #4 and the UL CC #5. As such, if the number of UL CCs is greater than the number of DL CCs, a plurality of UL CCs can be linked to one DL CC.

Figure 12:
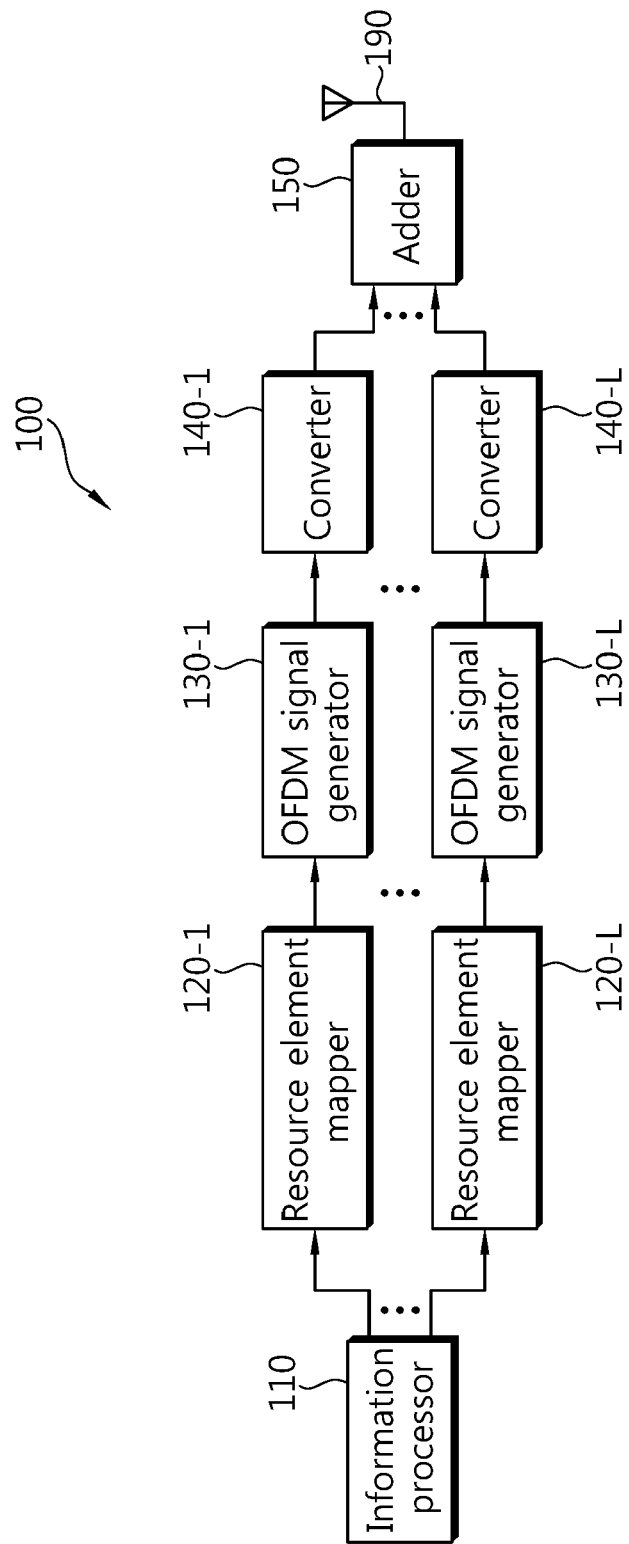
FIG. 12 is a block diagram showing an exemplary structure of a transmitter.

FIG. 12 is a block diagram showing an exemplary structure of a transmitter. Herein, the transmitter may be a part of a UE or a BS.

Referring to FIG. 12, a transmitter 100 includes an information processor 110, L resource element mappers 120-1, ..., 120-L, L OFDM signal generators 130-1, ..., 130-L, L converters 140-1, ..., 140-L, an adder 150, and an antenna 190, where L is a natural number. Herein, L is equal to the number of carriers used by the transmitter. A frame structure is defined for each carrier.

The L resource element mappers 120-1, ..., 120-L are respectively connected to the L OFDM signal generators 130-1, ..., 130-L. The L OFDM signal generators 130-1, ..., 130-L are respectively connected to the L converters 140-1, ..., 140-L. That is, the nth resource element mapper 120-$n$ is connected to the nth OFDM signal generator 130-$n$, and the nth OFDM signal generator 130-$n$ is connected to the nth converter 140-$n$ (where n=1, ..., L).

The information processor 110 is connected to the L resource element mappers 120-1, ..., 120-L, and is configured for information processing and information symbol generation. Examples of information include control information, user data, information in which several pieces of control information are combined, information in which the control information and the user data are multiplexed, etc. The information processor 110 may be configured to generate a bit-stream corresponding to the information, to generate a codeword by performing channel coding on the bit-stream, and to generate a modulation symbol by modulating and mapping the codeword. A plurality of codewords may be provided. Occasionally, discrete Fourier transform (DFT) may be performed on a modulation symbol to generate an information symbol. If the DFT is not performed, the modulation symbol may be the information symbol. A plurality of information symbols may be split for each carrier.

It is shown herein that one information processor 110 generates a plurality of information symbols, and the plurality of information symbols are split for each carrier. However, this is for exemplary purposes only, and thus the information processor 110 may be provided for each carrier so that the information symbol is generated for each carrier.

Each of the L resource element mappers 120-1, ..., 120-L is configured to map an information symbol to a resource element which is a time-frequency resource. One information symbol may be mapped to one resource element. Each of the L OFDM signal generators 130-1, ..., 130-L is configured to generate a time-continuous OFDM signal. The time-continuous OFDM symbol is also referred to as an OFDM baseband signal. Each of the L OFDM signal generators 130-1, ..., 130-L may generate the OFDM baseband signal by performing inverse fast Fourier transform (IFFT), cyclic prefix (CP) insertion, etc.

Each of the L converters 140-1, ..., 140-L converts its OFDM baseband signal into a radio signal for each CC. Each OFDM baseband signal may be converted into the radio signal by performing up-conversion at a carrier frequency. The carrier frequency is also referred to as a center frequency. Although it is shown herein that the transmitter includes a plurality of converters, the transmitter may include one converter capable of converting the OFDM baseband signal.

The adder 150 adds radio signals for respective CCs and then generates one radio signal. The antenna 190 transmits the radio signals. Although it is shown herein that one antenna 190 transmits the radio signals, this is for exemplary purposes only. The transmitter 100 may employ a plurality of antennas according to a transmission scheme. Examples of the transmission scheme include a single antenna scheme, a transmit diversity scheme, a large delay cyclic delay diversity (CDD) scheme, a closed-loop spatial multiplexing scheme, a multiple user (MU)-MIMO scheme, etc.

To support compatibility between a multiple carrier system and a single carrier system, one CC of the multiple carrier system may use the same frame structure as the single carrier system.

When a plurality of DL CCs and a plurality of UL CCs are allocated to a UE in the multiple carrier system, for which DL CC a CQI will be fed back needs to be considered. Further, over which UL CC the CQI will be transmitted also needs to be considered. Therefore, an effective CQI transmission method in the multiple carrier system is required. Hereinafter, the CQI transmission method in the multiple carrier system will be described.

Figure 13:
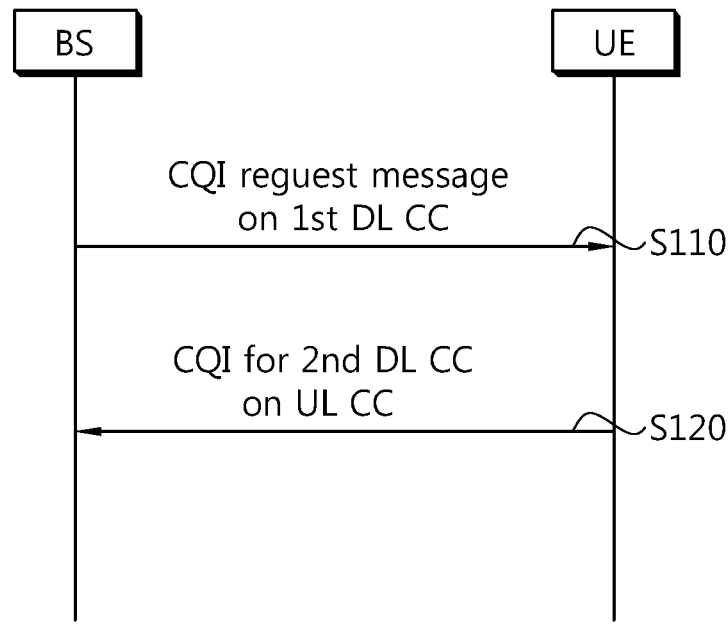
FIG. 13 is a flowchart showing a channel quality indicator (CQI) transmission method according to an embodiment of the present invention.

FIG. 13 is a flowchart showing a CQI transmission method according to an embodiment of the present invention.

Referring to FIG. 13, a UE receives a CQI request message from a BS over a $1^{st}$ DL CC (step S110). The UE transmits a CQI for at least one $2^{nd}$ DL CC to the BS over a UL CC (step S120). The $2^{nd}$ DL CC is a DL CC of which the CQI needs to be fed back after the CQI is measured by the UE. The $2^{nd}$ DL CC may be one DL CC or a plurality of DL CCs.

Hereinafter, the $1^{st}$ DL CC, the $2^{nd}$ DL CC, the CQI, the UL CC, a CQI transmission time, the CQI request message, or the like will be described in detail.

1. $1^{st}$ DL CC (1) Primary DL CC

The $1^{st}$ DL CC for transmitting the CQI request message may be determined as a primary DL CC. In this case, the UE receives the CQI request message over the primary DL CC.

The primary DL CC may be fixed. Alternatively, the primary DL CC may be selected from a plurality of DL CCs according to a rule. A rule by which the primary DL CC is selected is known to both the UE and the BS, and thus signaling for indicating the primary DL CC may not be necessary.

(2) Configuration Using Higher Layer Signaling

The $1^{st}$ DL CC may be configured by using signaling of a higher layer of a physical layer. For example, the higher layer may be an RRC layer. In this case, the $1^{st}$ DL CC may change semi-statically. The $1^{st}$ DL CC may be configured in a cell-specific manner or a UE-specific manner. If the $1^{st}$ DL CC is configured in a cell-specific manner, all UEs in a cell may have the same $1^{st}$ DL CC, and UEs belonging to different cells may have different $1^{st}$ DL CCs. If the $1^{st}$ DL CC is configured in a UE-specific manner, different UEs in the cell may have different $1^{st}$ DL CCs.

(3) DL CC for which Feedback is Required

If the BS desires to receive a feedback of a CQI for a specific DL CC from the UE, the BS transmits the CQI request message to the UE over the specific DL CC. That is, the CQI request message may be transmitted independently for each of a plurality of DL CCs.

2. $2^{nd}$ DL CC (1) Use of DL CC Linked to UL CC

First, a $2^{nd}$ DL CC may be all DL CCs linked to a UL CC. In this case, the UE measures a CQI for all of the DL CCs linked to the UL CC, and then transmits the CQI.

Second, the $2^{nd}$ DL CC may be a DL CC selected from a plurality of DL CCs linked to the UL CC.

For example, the $2^{nd}$ DL CC may be selected according to a predetermined order among the plurality of DL CCs linked to the UL CC. In this case, the UE transmits a CQI for the DL CC selected according to the order among the plurality of DL CCs linked to the UL CC. For example, the order of the plurality of DL CCs may be determined in an ascending order or descending order of frequency bands of the DL CCs.

For another example, the $2^{nd}$ DL CC may be selected implicitly among the plurality of DL CCs linked to the UL CC. For example, the $2^{nd}$ DL CC may be obtained from a radio resource by which the CQI request message is transmitted. When the CQI request message is transmitted over a CCE aggregation, the $2^{nd}$ DL CC may be obtained according to a $1^{st}$ CCE index used for transmission of the CQI request message, a CCE aggregation level, etc.

For another example, the $2^{nd}$ DL CC may be explicitly selected among the plurality of DL CCs linked to the UL CC. For example, the $2^{nd}$ DL CC may be configured by using signaling of a higher layer such as an RRC layer. Alternatively, the CQI request message may include a DL CC information field indicating the $2^{nd}$ DL CC.

(2) $1^{st}$ DL CC

The $2^{nd}$ DL CC may be identical to the $1^{st}$ DL CC. In this case, the UE transmits a CQI for the $1^{st}$ DL CC. The BS may perform DL transmission to the UE by using a plurality of DL CCs. If the BS desires to receive a feedback of a CQI for a specific DL CC among the plurality of DL CCs from the UE, the BS transmits the CQI request message to the UE over the specific DL CC. That is, the CQI request message may be transmitted independently for each of the plurality of DL CCs.

(3) Configuration Using Signaling

First, the $2^{nd}$ DL CC may be configured by using higher layer signaling such as RRC signaling. In this case, the $2^{nd}$ DL CC may change semi-statically. The $2^{nd}$ DL CC may be configured in a cell-specific manner or a UE-specific manner. If the $2^{nd}$ DL CC is configured in a cell-specific manner, all UEs in a cell may have the same $2^{nd}$ DL CC, and UEs belonging to different cells may have different $2^{nd}$ DL CCs. In this case, all UEs in a cell measure and report a CQI for the same DL CC. If the $2^{nd}$ DL CC is configured in a UE-specific manner, different UEs in the cell may have different $2^{nd}$ DL CCs.

Second, the $2^{nd}$ DL CC may be configured by using L1/L2 control signals.

(4) CQI Request Message Including DL CC Information Field

The CQI request message may include a DL CC information field indicating the $2^{nd}$ DL CC. In this case, the $2^{nd}$ DL CC may change whenever the CQI request message is transmitted. The $2^{nd}$ DL CC may be selected from a candidate set. The $2^{nd}$ DL CC may be all or some DL CCs belonging to the candidate set.

If the number of DL CCs constituting the candidate set is M (where M is a natural number), a bit size of the DL CC information field may be M. Alternatively, if the number of all cases that can be indicated by the $2^{nd}$ DL CC based on elements of the candidate set is N, a bit size of the DL CC information field may be ceiling(log 2(N)).

The DL CC information field may indicate the $2^{nd}$ DL CC in a bitmap format. For example, it is assumed that the candidate set consists of 5 DL CCs (i.e., DL CC #1, DL CC #2, . . . , DL CC #5), and a size of the DL CC information field is 5 bits. If a value of the DL CC information field is '00110', the DL CC #3 and the DL CC #4 among the 5 DL CCs are $2^{nd}$ DL CCs.

For one example, the candidate set may consist of a plurality of DL CCs linked to a UL CC. For another example, the candidate set may be configured by using higher layer signaling such as RRC signaling. The candidate set may be configured by using higher layer signaling in a cell-specific manner or a UE-specific manner. For another example, the candidate set may be configured by using L1/L2 control signals. For another example, the candidate set may be configured by the BS. For another example, the candidate set may be configured with all DL CCs allocated to the UE.

(5) Reuse of UL CC Information Field

The CQI request message may include a UL CC information field indicating a UL CC. The primary UL CC may be predetermined. In this case, the UE can transmit a CQI by using the primary UL CC, and thus there is no need to indicate the UL CC by the UL CC information field. Therefore, the BS may reuse the UL CC information field as an information field indicating the $2^{nd}$ DL CC. The UE may transmit a CQI for the $2^{nd}$ DL CC indicated by the UL CC information field over the primary UL CC.

(6) Selection by UE

The $2^{nd}$ DL CC may be selected by the UE among a plurality of DL CCs.

For one example, the UE may select N DL CCs as the $2^{nd}$ DL CC among the plurality of DL CCs in an order of DL CCs having a good channel state (where N is a natural number).

For another example, the UE may select the $2^{nd}$ DL CC on the basis of a resource allocation field included in the CQI request message. The resource allocation field allocates a radio resource for CQI transmission. If a size of the radio resource for CQI transmission for one DL CC is predetermined, the UE may determine the number of $2^{nd}$ DL CC by considering a size of the radio resource allocated by the resource allocation field. The UE may select the $2^{nd}$ DL CCs in the same number as the determined $2^{nd}$ DL CCs.

For another example, the $2^{nd}$ DL CC may be selected by considering an operation mode of the UE or an operation mode for each DL CC. For example, a CQI for DL CCs having a specific characteristic may be reported. A cooperative multipoints (CoMP) carrier, a relay backhaul carrier, a handover carrier, a measurement carrier, or the like may be selected as the $2^{nd}$ DL CC.

(7) Candidate Set

The candidate set may be configured so that the UE can use all or some of DL CCs belonging to the candidate set as the $2^{nd}$ DL CC. For example, a plurality of groups may be created from the DL CCs belonging to the candidate set by using a specific grouping rule. An order may be determined for each group, or may be determined implicitly or explicitly. A CQI for DL CCs belonging to a specific group may be transmitted according to the determined order.

Hereinafter, DL CCs constituting the candidate set will be described.

First, DL CCs ensured (or configured) by the BS (or system) for DL transmission may constitute the candidate set.

Second, among DL CCs ensured (or configured) by the BS (or system) for DL transmission, DL CCs activated or allocated by any cell or BS (or system) may constitute the candidate set.

Third, among DL CCs ensured (or configured) by the BS (or system) for DL transmission, DL CCs activated or allocated in a UE-specific manner by any cell or BS (or system) may constitute the candidate set.

Fourth, according to UE capability, DL CCs measurable by the UE in DL transmission may constitute the candidate set.

Fifth, DL CCs for which monitoring is allowed by the BS to the UE may constitute the candidate set.

The BS may designate the number of one or more $2^{nd}$ DL CCs desired to be reported to the UE. Alternatively, the number of $2^{nd}$ DL CCs selectable by the UE may be fixed always. However, a CQI size to be reported may differ according to the number of $2^{nd}$ DL CCs selected by the UE. Accordingly, more resources may be required than resources allocated for CQI transmission by the BS. Therefore, it is effective for the BS to designate or limit the number of $2^{nd}$ DL CCs selectable by the UE in a sense that the BS allocates a resource for CQI transmission and decodes the CQI. Alternatively, the number of $2^{nd}$ DL CCs selectable by the UE may be determined according to a resource allocated for CQI transmission.

The UE may report to the BS the number of $2^{nd}$ DL CCs desired to be reported. Information on the number of $2^{nd}$ DL CCs reported by the UE may be used as a basis for decoding when a CQI bit-stream for each $2^{nd}$ DL CC is separately coded. The CQI bit-stream for each $2^{nd}$ DL CC may be jointly coded for a specific reason. After ensuring the information on the number of $2^{nd}$ DL CCs, the BS can estimate an amount of information to be decoded.

3. CQI for $2^{nd}$ DL CC

In case of using a plurality of $2^{nd}$ DL CCs, the UE may measure a CQI for each of the plurality of $2^{nd}$ DL CCs, and then may transmit a CQI for the plurality of $2^{nd}$ DL CCs as follows.

First, the UE may transmit a CQI for one DL CC having a best channel state among the plurality of $2^{nd}$ DL CCs.

Second, the UE may transmit an average CQI for the plurality of $2^{nd}$ DL CCs.

Third, the UE may transmit a reference CQI for one CC among the plurality of $2^{nd}$ DL CCs and a differential CQI for the remaining $2^{nd}$ DL CCs.

Fourth, the UE may transmit a CQI for each of the plurality of $2^{nd}$ DL CCs.

Next, a channel coding scheme will be described when transmitting the CQI for each of the plurality of $2^{nd}$ DL CCs.

A joint-coding scheme or a separate-coding scheme may be used as the channel coding scheme. In the joint-coding scheme, a bit-stream in which CQI bit-streams corresponding to the respective $2^{nd}$ DL CCs are combined is channel-coded together. The BS may obtain a CQI bit-stream for each of the plurality of $2^{nd}$ DL CCs by performing channel decoding one time. In the separate-coding scheme, the CQI bit-streams corresponding to the respective $2^{nd}$ DL CCs are individually channel-coded to generate respective coded-bit streams.

4. UL CC (1) UL CC Linked to $1^{st}$ DL CC

The UE may transmit a CQI over a UL CC linked to the $1^{st}$ DL CC on which the CQI request message is transmitted. As such, the UE may implicitly know a UL CC for transmitting the CQI.

(2) Configuration Using Higher Layer Signaling

A UL CC on which a CQI is transmitted may be configured by using higher layer signaling such as RRC signaling. The UL CC may change semi-statically. The UL CC may be configured in a cell-specific manner or a UE-specific manner.

(3) CQI Request Message Including UL CC Information Field

The CQI request message may include a UL CC information field indicating a UL CC. The UE transmits a CQI over a UL CC indicated by the UL CC information field.

(4) Primary UL CC

When the primary UL CC is determined, the UE transmits a CQI over the primary UL CC. The primary UL CC may be fixed. Alternatively, the UL CC may be selected from a plurality of UL CCs according to a rule. A rule by which the primary UL CC is selected is known to both the UE and the BS, and thus signaling for indicating the primary UL CC may not be necessary.

5. CQI Transmission Time

First, the CQI transmission time may be predetermined between the BS and the UE. For example, the CQI transmission time may be determined according to a transmission time of the CQI request message. More specifically, in case of using frequency division duplex (FDD) as a duplex scheme, if the CQI request message is transmitted using an nth subframe, a CQI may be transmitted using an $(n+4)^{th}$ subframe.

Second, the BS may report the CQI transmission time to the UE by using signaling. The CQI transmission time may be transmitted using L1 signaling, L2 signaling, or L3 signaling. As an example of the L1 signaling, a UL index indicating information on the CQI transmission time may be included in the CQI request message.

6. CQI Request Message

The CQI request message may include a resource allocation field, a DL CC information field, a UL CC information field, a UL index, etc. The resource allocation field allocates a radio resource for CQI transmission. The DL CC information field indicates the $2^{nd}$ DL CC. The UL CC information field indicates the UL CC. The UL index indicates the CQI transmission time. However, this is for exemplary purposes only, and thus the CQI request message can be configured in various forms. The CQI request message may be transmitted by being included in the UL grant.

Figure 14:
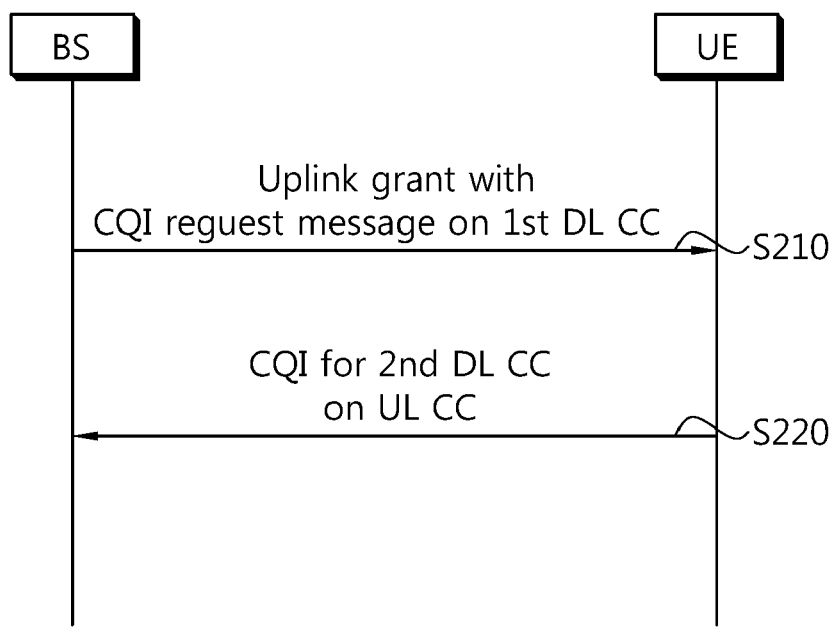
FIG. 14 is a flowchart showing a CQI transmission method according to another embodiment of the present invention.

FIG. 14 is a flowchart showing a CQI transmission method according to another embodiment of the present invention.

Referring to FIG. 14, a UE receives a UL grant including a CQI request message from a BS over a $1^{st}$ DL CC (step S210). The UE transmits a CQI for at least one $2^{nd}$ DL CC over a UL CC (step S220). All contents described in FIG. 13 may apply to the CQI transmission method of FIG. 14. The CQI request message described in FIG. 13 may be interpreted as a UL grant including the CQI request message.

The UL grant includes the CQI request message. The CQI request message indicates whether a CQI will be reported. A bit size of the CQI request message may be 1 bit. In this case, if the CQI request message is '1', the BS requests the UE to report the CQI, and if the CQI request message is '0', the BS does not request the UE to report the CQI. When the CQI request message requests the CQI report, it means that the CQI request message is activated.

If the UL grant includes the CQI request message requesting a CQI feedback, the UE transmits information in which UL data and the CQI are multiplexed based on the UL grant or transmits the CQI alone. The UL data may be a transport block which is a data block for a UL-SCH transmitted during a TTI. Hereinafter, the CQI or the information in which the UL data and the CQI are multiplexed is referred to as CQI information. The UL grant may be transmitted over a PDCCH. The CQI information may be transmitted over a PUSCH. The UL grant may use the downlink control information (DCI) format 0 of 3GPP LTE.

It is assumed hereinafter that the CQI request message requests the CQI report.

The information field included in the CQI request message described in FIG. 13 may be an information field included in the UL grant. For example, a DL CC information field, a UL CC information field, a UL index, or the like may be included in the UL grant.

The UL grant may include the CQI request message and the DL CC information field in a different manner. For example, a bit size of the CQI request message may be 1 bit, and a bit size of the DL CC information field may be M bits. Alternatively, the UL grant may include one CQI request message which indicates whether a CQI is requested and which indicates a CQI DL CC. In this case, a bit size of the CQI request message may be L bits.

The resource allocation field allocates a radio resource for CQI information transmission. The radio resource may be a time-frequency resource. In 3GPP LTE, the radio resource indicated by the resource allocation field is a resource block.

The UL grant may further include an MCS field. The MCS field indicates a modulation scheme and a channel coding scheme for CQI information. The MCS field may further indicate a size of CQI information, a redundancy version (RV), etc. A value of the MCS field may be one MCS index selected from an MCS table. The MCS table is a set of MCS indices used for CQI information transmission. Each of the MCS indices of the MCS table may correspond to a modulation scheme for CQI information and a channel coding scheme for CQI information.

In addition thereto, the UL grant may further include a format flag for distinguishing a control information format different from a control information format of the UL grant, a hopping flag for indicating whether a radio resource for transmitting CQI information is frequency-hopped, a new data indicator (NDI) for indicating whether the UL grant is for new UL data transmission or UL data retransmission, a transmit power control (TPC) command field for indicating information for UL power control, a cyclic shift field for indicating information related to cyclic shift of a reference signal (RS) for demodulation, a UL index for indicating information on a CQI information transmission time, a downlink assignment index (DAI) for indicating a DL subframe linked to one UL subframe for ACK/NACK bundling, etc. The UL index and the DAI may be included in the control information format of the UL grant only when time division duplex (TDD) is used as the duplex scheme.

If a bit-stream size of the control information format of the UL grant is less than a bit-stream size of another control information format, the control information format of the UL grant may be appended with '0' until the two bit-sizes become identical.

The control information format of the UL grant described above is for exemplary purposes only. A type of the information fields included in the control information format of the UL grant and a bit size of each information field may change variously.

The UL grant may include a DL CC information field indicating the $2^{nd}$ DL CC. Alternatively, the UL grant may use pre-defined another information filed as the DL CC information field. For example, the cyclic shift field may be used as the DL CC information field. If a size of the cyclic shift field is 3 bits, some bits (e.g., 1 bit or 2 bits) of the cyclic shift field may be used for $2^{nd}$ DL CC indication. Alternatively, information indicated by the cyclic shift field is information regarding a series of combinations between cyclic shift-related information in a soft state and the $2^{nd}$ DL CC indication, and may be mapped to a certain state.

For example, a case where the $2^{nd}$ DL CC is identical to the $1^{st}$ DL CC and the UL CC is linked to the $1^{st}$ DL CC is taken into account. The UL grant may be transmitted independently for each of DL CCs. The CQI request message included in the UL grant may be activated independently for each of DL CCs transmitting the UL grant. The UE transmits UL data by using a UL CC linked to a corresponding DL CC on the basis of the UL grant obtained using each DL CC. If the CQI request message is activated, the UE transmits CQI information instead of UL data. The CQI information includes a CQI for a DL CC on which the UL grant is transmitted.

A CQI request configuration may be delivered by using L1/L2 control signals. The L1/L2 control signals may have a format of control information transmitted over a PDCCH or a PDSCH. The L1/L2 control signals may be a control signal for reporting information on a UE-specific CC aggregation. In this case, CQI request configuration information becomes effective by the CQI request message for requesting a CQI report after a corresponding carrier aggregation is activated.

Figure 15:
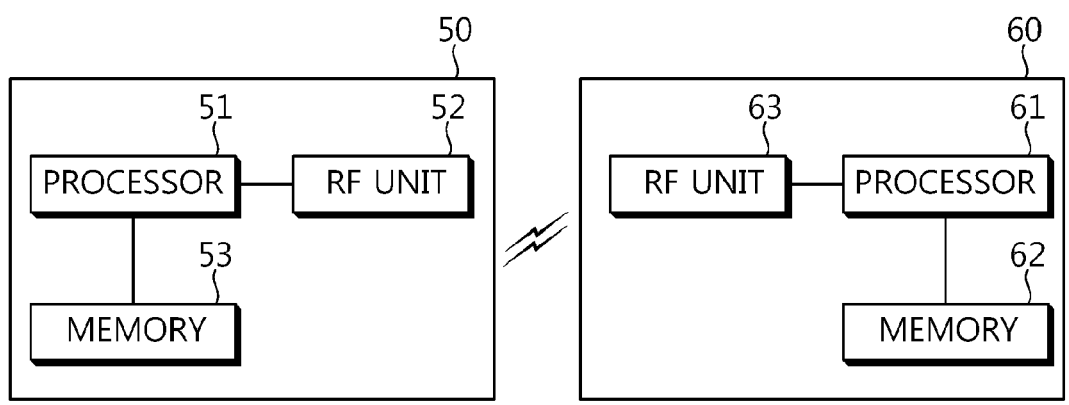
FIG. 15 is a block diagram showing a wireless communication apparatus for implementing an embodiment of the present invention.

FIG. 15 is a block diagram showing a wireless communication apparatus for implementing an embodiment of the present invention. A BS 50 includes a processor 51, a memory 52, and a radio frequency (RF) unit 53. The processor 51 implements proposed functions, processes, and/or methods. Layers of radio interface protocols can be implemented by the processor 51. The memory 52 is coupled to the processor 51, and stores a variety of information for driving the processor 51. The RF unit 53 is coupled to the processor 51, and transmits and/or receives a radio signal. A UE 60 includes a processor 61, a memory 62, and an RF unit 63. The processor 61 implements proposed functions, processes, and/or methods. Layers of radio interface protocols can be implemented by the processor 61. The memory 62 is coupled to the processor 61, and stores a variety of information for driving the processor 61. The RF unit 63 is coupled to the processor 61, and transmits and/or receives a radio signal.

The processors 51 and 61 may include an application-specific integrated circuit (ASIC), a separate chipset, a logic circuit, a data processing unit, and/or a converter for mutually converting a baseband signal and a radio signal. The transmitter of FIG. 12 can be implemented in the processors 51 and 61. The memories 52 and 62 may include a read-only memory (ROM), a random access memory (RAM), a flash memory, a memory card, a storage medium, and/or other equivalent storage devices. The RF units 53 and 63 include one or more antennas for transmitting/receiving radio signals. When the embodiment of the present invention is implemented in software, the afore-mentioned methods can be implemented with a module (i.e., process, function, etc.) for performing the aforementioned functions. The module may be stored in the memories 52 and 62 and may be performed by the processors 51 and 61. The memories 52 and 62 may be located inside or outside the processors 51 and 61, and may be coupled to the processors 51 and 61 by using various well-known means.

As described above, a method and apparatus for effectively transmitting a CQI in a wireless communication system can be provided. Therefore, in a multiple carrier system supporting a plurality of DL CCs and a plurality of UL CCs, ambiguity regarding over which UL CC a CQI for a specific DL CC will be transmitted can be solved. In addition, backward compatibility with a single carrier system can be maintained. As a result, overall system performance can be improved.

Additional advantages, objectives, and features of the present invention will become more apparent to those of ordinary skill in the art upon implementation of the present invention based on the aforementioned descriptions or explanations. Moreover, other unexpected advantages may be found as those ordinary skilled in the art implement the present invention based on the aforementioned explanations.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

Various modifications may be made in the aforementioned embodiments. Although all possible combinations of the various modifications of the embodiments cannot be described, those ordinary skilled in that art will understand possibility of other combinations. For example, those ordinary skilled in the art will be able to implement the invention by combining respective structures described in the aforementioned embodiments. Therefore, the present invention is not intended to be limited to the embodiments shown herein but is to be accorded the widest scope consistent with the principles and novel features disclosed herein.

The invention claimed is:

1. A method for transmitting a channel quality indicator (CQI), performed by a user equipment, in a wireless communication system, the method comprising:
receiving, by the user equipment via a first downlink component carrier, a radio resource control (RRC) signal including a bitmap indicating one or more second downlink component carriers, among a plurality of downlink component carriers,
wherein each bit in the bitmap has either a value 0 indicating that a corresponding second downlink component carrier is subject to CQI reporting or a value 1 indicating that the corresponding second downlink component carrier is not subject to CQI reporting,
wherein at most 5 bits in the bitmap have the value 1;
receiving, by the user equipment via the first downlink component carrier from a base station, an uplink grant including a request for a CQI report for a downlink component carrier set, the downlink component carrier set including the one or more second downlink component carriers which was indicated by the bitmap in the RRC signal;
determining a transmission timing for the CQI report; and
transmitting, by the user equipment on the transmission timing over an uplink component carrier to the base station, the CQI report for one or more second downlink component carriers indicated by the bitmap of the RRC signal among the plurality of downlink component carriers.

2. The method of claim 1, wherein the uplink component carrier is linked to the first downlink component carrier.

3. The method of claim 1, wherein the one or more second downlink component carriers indicated by the bitmap are linked to the uplink component carrier.

4. The method of claim 1, wherein the one or more second downlink component carriers of the CQI report is the first downlink component carrier.

5. The method of claim 1, wherein the uplink component carrier is configured by RRC signaling.

6. The method of claim 1, wherein the uplink grant comprises a downlink component carrier information field indicating the one or more second downlink component carriers for which the CQI report is requested.

7. The method of claim 1, wherein the uplink grant comprises an uplink component carrier information field indicating the uplink component carrier.

8. The method of claim 1, wherein the first downlink component carrier is a primary downlink component carrier, and the uplink component carrier is a primary uplink component carrier.

9. The method of claim 1, wherein the one or more second downlink component carriers included in the transmitted CQI report are selected by the user equipment.

10. The method of claim 1, wherein the uplink grant comprises a resource allocation field that allocates a radio resource for the CQI transmission.

11. The method of claim 10, wherein a number of the one or more second downlink component carriers included in the transmitted CQI report is determined according to a size of the radio resource allocated by the resource allocation field.

12. The method of claim 1, wherein the CQI report is transmitted based on the uplink grant.

13. A wireless communication apparatus comprising:
a radio frequency (RF) unit configured to transmit and receive a radio signal; and
a processor coupled to the RF unit and configured to:
receive, via a first downlink component carrier, a radio resource control (RRC) signal including a bitmap indicating one or more second downlink component carriers, among a plurality of downlink component carriers,
wherein each bit in the bitmap has either a value 0 indicating that a corresponding second downlink component carrier is subject to channel quality indicator (CQI) reporting or a value 1 indicating that the corresponding second downlink component carrier is not subject to CQI reporting,
wherein at most 5 bits in the bitmap have the value 1;
receive, via the first downlink component carrier, an uplink grant including a request for a CQI report for a downlink component carrier set, the downlink component carrier set including the one or more second downlink component carriers which was indicated by the bitmap in the RRC signal, determine a transmission timing for the CQI report, and
transmit, on the transmission timing over an uplink component carrier, the CQI report for one or more second downlink component carriers indicated by the bitmap of the RRC signal among the plurality of downlink component carriers.

\* \* \* \* \*